United States Patent
Wessels et al.

(10) Patent No.: US 6,285,171 B1
(45) Date of Patent: Sep. 4, 2001

(54) DC-DC CONVERTER

(75) Inventors: Johannes Hendrik Wessels; Wilhelmus Hunderikus Maria Langeslag, both of Eindhove (NE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/707,500

(22) Filed: Nov. 7, 2000

(30) Foreign Application Priority Data

Nov. 9, 1999 (EP) .................................................. 99203743

(51) Int. Cl.$^7$ .................................................. G05F 1/613
(52) U.S. Cl. ............................................. 323/222; 323/282
(58) Field of Search ..................................... 323/220, 222, 323/223, 225, 282, 284

(56) References Cited

U.S. PATENT DOCUMENTS

| | | |
|---|---|---|
| 4,291,259 | 9/1981 | Marumoto et al. .................. 318/139 |
| 4,392,103 * | 7/1983 | O'Sullivan et al. .................. 323/222 |
| 4,529,927 * | 7/1985 | O'Sullivan et al. .................. 323/222 |
| 4,999,566 * | 3/1991 | Kuehn .................................. 323/222 |
| 5,027,051 * | 6/1991 | Lafferty ............................... 323/222 |
| 5,233,287 * | 8/1993 | Lenk .................................... 323/268 |
| 5,350,997 * | 9/1994 | Ghotbi et al. ....................... 323/268 |
| 5,461,302 * | 10/1995 | Garcia et al. ....................... 323/222 |
| 5,909,108 * | 6/1999 | He et al. ............................. 323/225 |
| 5,949,222 * | 9/1999 | Buono ................................. 323/222 |
| 6,008,630 * | 12/1999 | Prasad ................................. 323/222 |

FOREIGN PATENT DOCUMENTS

| | | | |
|---|---|---|---|
| 55149854A | 11/1980 | (EP) | .............................. G01R/19/00 |
| 0514064A2 | 11/1992 | (EP) | .............................. H03K/17/08 |
| 0514064A3 | 11/1992 | (EP) | .............................. H03K/17/08 |

* cited by examiner

*Primary Examiner*—Adolf Deneke Berhane

(57) ABSTRACT

In an up-converter comprising two parallel switching elements, the total current through these switching elements is measured using a current sensor consisting of four ohmic resistances, and said total current is controlled so as to be at a constant level. The power dissipation in the current sensor and in the switching elements can be kept at a low level.

3 Claims, 1 Drawing Sheet

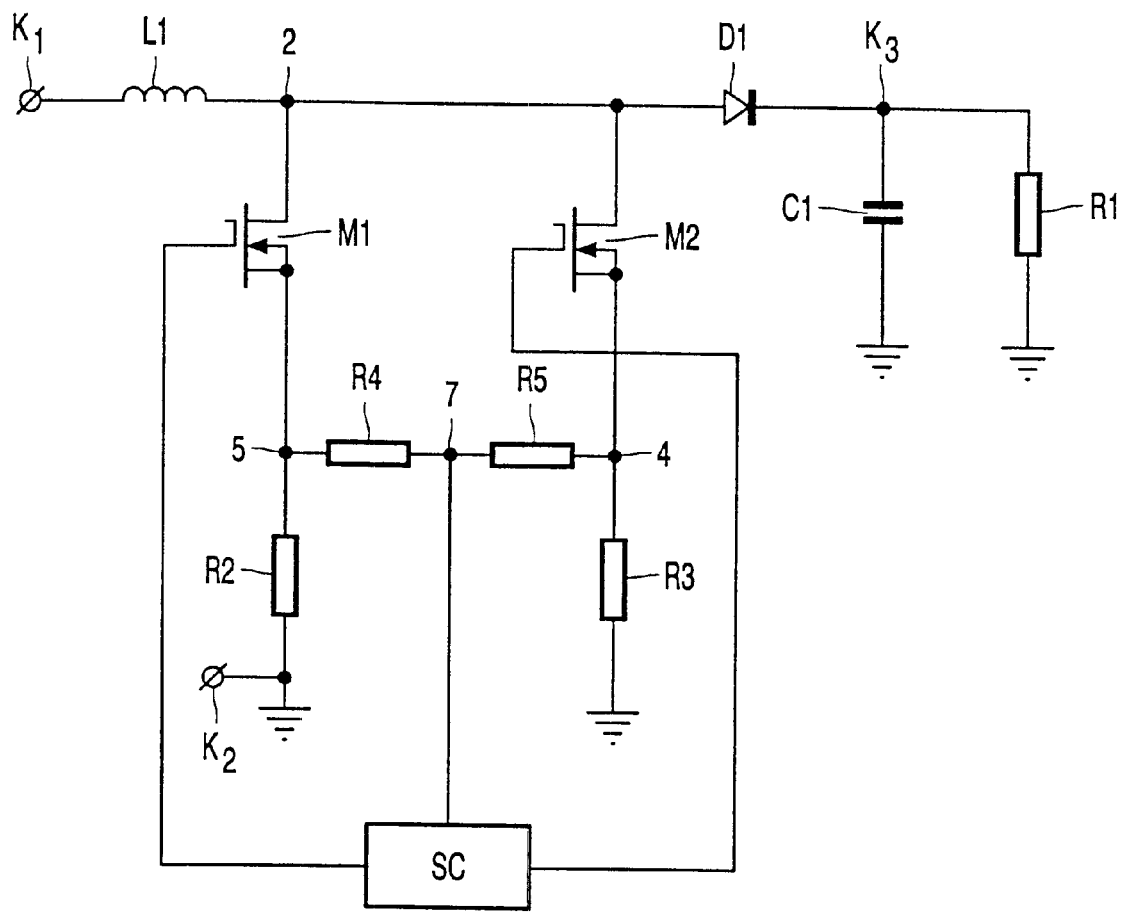

DC-DC CONVERTER

The invention relates to a DC-DC converter comprising
input terminals for connecting it to a supply-voltage source,
a first branch, coupled to one of the input terminals, which includes a series arrangement of an inductive element and a unidirectional element,
switching means comprising at least two switching elements, each switching element forming part of a switching branch which includes a series arrangement of the switching element and an impedance, said switching branch being connected with a first end to a point between the inductive element and the unidirectional element, and with a second end to one of the input terminals,
a control circuit coupled to control electrodes of the switching elements for rendering the switching means alternately conducting and non-conducting,
a current sensor provided with an output coupled to the control circuit for generating a signal which, during operation, is present at the output and which is a measure of a current through the switching means.

Such a DC-DC converter is disclosed in U.S. Pat. No. 4,291,259. In the known DC-DC converter, the impedances in the switching branches are formed by ohmic resistances. The impedance value of these ohmic resistances in the switching branches is such that, when the switching elements are in the conducting state, the current in each switching branch is determined by the impedance value of the ohmic resistance in the switching branch. As a result, there is a simple relation between the currents in the different switching branches. This makes it possible to control the total current through the switching means by controlling the current in a switching branch. The current sensor is formed by one of the resistances in the switching branches, the voltage across the resistance forming the signal which is a measure of the current through the switching means. As a result, the control circuit controls the conduction state of all switching elements in dependence upon the voltage across the ohmic resistance connected in series with one of the switching elements. An advantage of the known DC-DC converters is that the current sensor is constructed in a very simple manner. A drawback of the known DC-DC converter is, however, that the ohmic resistances in the switching branches have a comparatively high impedance value, causing a comparatively high power dissipation in these ohmic resistances during operation.

It is an object of the invention to provide a DC-DC converter wherein the current through the switching means is controlled, and wherein, during operation, the power dissipation occurring in the switching branches is comparatively small.

To achieve this, a DC-DC converter as described in the opening paragraph is characterized in accordance with the invention in that each of the impedances in the switching branches is connected via a signal branch to the output of the current sensor, and the current sensor comprises the impedances in the switching branches and the signal branches.

As each of the impedances in the switching branches is connected, via a signal branch, to the output of the current sensor, the signal at the output of the current sensor is a measure of the total current through the switching means, and not only of the current in a switching branch. As the total current through the switching means is measured, a simple relation between the currents in the different switching branches is not necessary. For this reason, the impedance values of the impedances in the switching branches can be chosen to be comparatively low, and, during operation, only a comparatively small power dissipation occurs in these impedances. This power dissipation decreases as the impedance value of the impedances in the switching branches decreases, and as the impedance of the signal branches increases.

In a comparatively simple and hence inexpensive embodiment of a DC-DC converter in accordance with the invention, the impedances in the switching branches are formed by ohmic resistances.

It has been found to be advantageous to provide each of the signal branches with an ohmic resistance. As a result, the power dissipation in the DC-DC converter is further reduced.

These and other aspects of the invention will be apparent from and elucidated with reference to the embodiment(s) described hereinafter.

In the drawing:

FIG. 1 diagrammatically shows an example of a DC-DC converter in accordance with the invention.

In FIG. 1, K1 and K2 are input terminals for connecting the converter to a supply-voltage source. Input terminal K1 is connected to a first end of a series arrangement of coil L1 and diode D1, which series arrangement forms a first branch in this example. Coil L1 forms an inductive element, and diode D1 forms a unidirectional element. A first switching branch is formed by the series arrangement of switching element M1 and ohmic resistance R2, which connects a point between coil L1 and diode D1 to input terminal K2. Ohmic resistance R2 forms an impedance which forms part of the first switching branch. A second switching branch is formed by the series arrangement of switching element M2 and ohmic resistance R3, which also connects a point between coil L1 and diode D1 to input terminal K2. Ohmic resistance R3 forms an impedance which forms part of the second switching branch. In this example, switching elements M1 and M2 jointly form switching means. A common point of switching element M1 and ohmic resistance R2 is connected to a common point of switching element M2 and ohmic resistance R3 by means of a series arrangement of ohmic resistance R4 and ohmic resistance R5. Ohmic resistances R2, R3, R4 and R5 jointly form a current sensor for generating a signal which is a measure of the current through the switching means. An output of the current sensor is formed by a common point of ohmic resistances R4 and R5. The output of the current sensor is connected to an input of the circuit part SC which, in this example, forms a control circuit for rendering the switching means alternately conducting and non-conducting. For this purpose, a first output of circuit part SC is connected to a control electrode of switching elements M1, and a second output of the circuit part SC is connected to a control electrode of switching elements M2. A second end of the first branch is connected to a first output terminal K3 of the DC-DC converter. A second output terminal is formed by input terminal K2. The output terminals K3 and K2 are connected to each other by capacitor C1, which serves as a buffer capacitor. Ohmic resistance R1 also connects the two output terminals to each other and is a schematic representation of a load fed by the DC-DC converter.

The operation of the example shown in FIG. 1 will be described hereinafter.

If the input terminals K1 and K2 are connected to the poles of a supply-voltage source supplying a DC supply voltage, then the switching elements M1 and M2 are simultaneously rendered alternately conducting and non-conducting by the circuit part SC. As a result, a DC current is generated in coil L1, which current charges capacitor C1 when the switching elements are non-conducting. A voltage is present on the output of the current sensor, which voltage is a measure of the total current through the switching means, or, in other words, the sum of the current in the first switching branch and the second switching branch. By means of the duty cycle of the signal with which circuit part SC renders the switching elements conducting and non-conducting, this total current through the switching means is controlled so as to be at a desired level by the circuit part SC. This current control also functions if the impedance of resistances R2 and R3 is chosen to be very low. Good results have been achieved with a practical embodiment of the DC-DC converter shown in FIG. 1, in which resistances of 1 Ohm were used for R2 and R3, and resistances of 1 KOhm were used for R4 and R5.

What is claimed is:

1. A DC-DC converter comprising input terminals for connecting it to a supply-voltage source, a first branch, coupled to one of the input terminals, which includes a series arrangement of an inductive element and a unidirectional element, switching means comprising at least two switching elements, each switching element forming part of a switching branch which includes a series arrangement of the switching element and an impedance, said switching branch being connected with a first end to a point between the inductive element and the unidirectional element, and with a second end to one of the input terminals, a control circuit coupled to control electrodes of the switching elements for rendering the switching means alternately conducting and non-conducting, a current sensor provided with an output coupled to the control circuit for generating a signal which, during operation, is present at the output and which is a measure of a current through the switching means, characterized in that each one of the impedances in the switching branches is connected to the output of the current sensor via a signal branch, and the current sensor comprises the impedances in the switching branches and the signal branches.

2. A DC-DC converter as claimed in claim 1, wherein the impedances in the switching branches are formed by ohmic resistances.

3. A DC-DC converter as claimed in claim 1, wherein each of the signal branches comprises an ohmic resistance.

* * * * *